US010673972B2

(12) United States Patent
Zhang

(10) Patent No.: US 10,673,972 B2
(45) Date of Patent: Jun. 2, 2020

(54) METHOD AND DEVICE FOR PROCESSING CONTINUOUS REDIRECTION

(71) Applicants: ALIBABA GROUP HOLDING LIMITED, Grand Cayman (KY); Yan Zhang, Hangzhou (CN)

(72) Inventor: Yan Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 156 days.

(21) Appl. No.: 15/505,418

(22) PCT Filed: Aug. 11, 2015

(86) PCT No.: PCT/CN2015/086614
§ 371 (c)(1),
(2) Date: Feb. 21, 2017

(87) PCT Pub. No.: WO2016/026400
PCT Pub. Date: Feb. 25, 2016

(65) Prior Publication Data
US 2017/0272531 A1     Sep. 21, 2017

(30) Foreign Application Priority Data
Aug. 22, 2014  (CN) .......................... 2014 1 0418834

(51) Int. Cl.
*H04L 29/08*     (2006.01)
*H04L 29/14*     (2006.01)
(52) U.S. Cl.
CPC .......... *H04L 67/2814* (2013.01); *H04L 29/08* (2013.01); *H04L 69/40* (2013.01)
(58) Field of Classification Search
CPC .......................... H04W 36/0079; H04W 36/14
See application file for complete search history.

(56) References Cited

U.S. PATENT DOCUMENTS

| 5,222,125 A | 6/1993 | Creswell et al. |
| 5,432,845 A | 7/1995 | Burd et al. |

(Continued)

FOREIGN PATENT DOCUMENTS

| CN | 101207914 A | 6/2008 |
| CN | 102098594 A | 6/2011 |

(Continued)

OTHER PUBLICATIONS

Search Report for European Application No. 15834055, dated Jan. 16, 2018, 8 pages.

(Continued)

*Primary Examiner* — Aftab N. Khan
(74) *Attorney, Agent, or Firm* — Sheppard Mullin Richter & Hampton LLP

(57) ABSTRACT

Disclosed are a method and device for processing continuous redirection. The method comprises: when a service request that redirection processing needs to be performed is received, the number of redirections corresponding to the service request is determined and it is judged whether the number of redirections reaches a pre-set threshold value; if so, the redirection of the service request is interrupted, and after the redirection of the service request is interrupted, the service request is resumed redirecting to a destination address; and if not, the service request is redirected to the destination address. In the embodiments of the present application, a redirection processing device can avoid error processing (e.g. 404 error) induced by the case where the number of 302 redirections exceeds the number of times restricted by a browser and thus avoid service interruption and service failure, thereby improving the service experience and the user experience.

8 Claims, 3 Drawing Sheets

(56) References Cited

U.S. PATENT DOCUMENTS

| | | |
|---|---|---|
| 7,224,642 B1 | 5/2007 | Tran |
| 7,289,519 B1 | 10/2007 | Liskov |
| 7,587,503 B2* | 9/2009 | Sato .................. G06F 21/10 709/203 |
| 7,603,696 B2 | 10/2009 | Trumper et al. |
| 7,760,720 B2 | 7/2010 | Pullela et al. |
| 8,217,803 B2 | 7/2012 | El-Hamamsy et al. |
| 8,745,266 B2 | 6/2014 | Agarwal et al. |
| 8,780,718 B2 | 7/2014 | Gandhewar et al. |
| 8,850,056 B2 | 9/2014 | Chouanard et al. |
| 8,856,281 B2 | 10/2014 | Van der Merwe et al. |
| 9,800,690 B1* | 10/2017 | Clarke ................ H04L 67/2814 |
| 2002/0078191 A1 | 6/2002 | Lorenz |
| 2002/0143798 A1 | 10/2002 | Lisiecki et al. |
| 2002/0194483 A1 | 12/2002 | Wenocur et al. |
| 2003/0002503 A1* | 1/2003 | Brewer .................. H04L 47/10 370/392 |
| 2003/0093523 A1* | 5/2003 | Cranor .............. H04L 29/12132 709/225 |
| 2005/0010662 A1* | 1/2005 | Prabhakar ............... G06F 9/524 709/224 |
| 2005/0021863 A1 | 1/2005 | Jungck |
| 2005/0044270 A1* | 2/2005 | Grove .................. H04L 29/12018 709/238 |
| 2005/0262253 A1 | 11/2005 | Li et al. |
| 2007/0168506 A1* | 7/2007 | Douglas .................. H04L 67/22 709/224 |
| 2007/0173252 A1 | 7/2007 | Jiang |
| 2007/0214083 A1* | 9/2007 | Jones .................... G06Q 20/10 705/41 |
| 2009/0234972 A1* | 9/2009 | Raghu ................ H04L 67/2804 709/246 |
| 2011/0082937 A1* | 4/2011 | Barbaresi ............. H04W 36/14 709/226 |
| 2011/0145435 A1* | 6/2011 | Bhatawdekar ........ G06F 21/566 709/238 |
| 2012/0158971 A1 | 6/2012 | Takahashi |
| 2013/0016625 A1 | 1/2013 | Murias et al. |
| 2013/0107737 A1 | 5/2013 | Lee et al. |
| 2013/0246199 A1 | 9/2013 | Carlson |
| 2014/0173054 A1* | 6/2014 | Varney ................ H04L 41/0893 709/219 |
| 2015/0326671 A1* | 11/2015 | Khan .................... H04L 67/141 709/203 |

FOREIGN PATENT DOCUMENTS

| | | |
|---|---|---|
| CN | 102291390 A | 12/2011 |
| CN | 102685215 A | 9/2012 |
| CN | 102870470 A | 1/2013 |
| CN | 103019960 A | 4/2013 |
| JP | 2004-110094 A | 4/2004 |
| JP | 2006-227998 A | 8/2006 |
| WO | 2011/024930 A1 | 1/2013 |

OTHER PUBLICATIONS

Japanese Office Action for Application No. 2017-510569, dated Dec. 5, 2017, 5 pages.

Final Office Action dated Jul. 3, 2018, issued in Japanese Patent Application No. 2017-510569 (6 pages).

Chinese First Search dated Mar. 20, 2018, issued in Chinese Patent Application No. 201410418834.4 (1 page).

Chinese First Office Action dated Apr. 4, 2018, issued in Chinese Patent Application No. 201410418834.4 (7 pages).

International Preliminary Report on Patentability dated Feb. 28, 2017, issued in International Application No. PCT/CN2015/086614 (7 pages).

First Office Action dated Aug. 20, 2018, issued in Korean Application No. 10-2017-7004878 (7 pages).

International Search Report and Written Opinion for Application No. PCT/CN2015/086614, dated Nov. 10, 2015, 13 pages.

Second Office Action dated Nov. 1, 2018, issued in related Chinese Application No. 201410418834.4 (13 pages), with English machine translation.

Examination Report dated Feb. 8, 2019, issued in related European Application No. 15834055.4 (8 pages).

Notice of Allowance dated Feb. 25, 2019, issued in related Korean Application No. 10-2017-7004878 (3 pages), with English machine translation.

Decision to Grant dated Mar. 12, 2019, issued in related Japanese Application No. 2017-510569 (6 pages), with English machine translation.

First Examination Report for Indian Application No. 201747001691 dated Oct. 16, 2019 (5 pages).

* cited by examiner

METHOD AND DEVICE FOR PROCESSING CONTINUOUS REDIRECTION

CROSS-REFERENCE TO RELATED APPLICATIONS

This application is a national phase application of International Application No. PCT/CN2015/086614, filed on Aug. 11, 2015, which claims priority to and benefits of Chinese Patent Application No. 201410418834.4, filed on Aug. 22, 2014. The contents of the above-referenced applications are incorporated herein by reference in their entirety.

TECHNICAL FIELD

The present application relates to the field of Internet, and in particular, to a method and device for processing continuous redirection.

BACKGROUND ART

In a large website or distributed system, when a client (browser) sends a service request to a server, the service request is sent to an address A, the service request is then 302 redirected by the server to an address B, the service request is then 302 redirected by the server to an address C, the service request is then 302 redirected by the server to an address D, and so on, and the service request may be 302 redirected multiple times.

However, the browser restricts the number of 302 redirections. If the number of 302 redirections exceeds the number of times restricted, the browser may perform error processing, for example, output a 404 error. At this point, the service cannot be continued, that is, the service is interrupted, thus affecting users' service experience.

SUMMARY

Embodiments of the present application provide a method and device for processing continuous redirection, which can avoid error processing induced by the case where the number of redirections in redirection exceeds the number of times restricted.

The embodiments of the present application provide a method for processing continuous redirection, including:

when a service request that redirection processing needs to be performed is received, determining the number of redirections corresponding to the service request, and judging whether the number of redirections reaches a pre-set threshold value;

if so, interrupting the redirection of the service request, and after the redirection of the service request is interrupted, resuming the redirection of the service request to a destination address; and if not, redirecting the service request to the destination address.

The process of interrupting the redirection of the service request, and after the redirection of the service request is interrupted, resuming the redirection of the service request to a destination address specifically includes:

temporarily inserting an intermediate page, to interrupt continuous redirection corresponding to the service request by inserting the intermediate page; and after the redirection of the service request is interrupted by inserting the intermediate page, resuming the redirection of the service request to the destination address.

The head of a Hyper Text Markup Language (HTML) of the intermediate page includes a pre-set instruction for resuming the redirection of the service request to the destination address after the intermediate page is inserted.

The process of interrupting the redirection of the service request, and after the redirection of the service request is interrupted, resuming the redirection of the service request to a destination address specifically includes:

calling an interruption manner configured in a continuous 302 redirection method pool, and interrupting continuous redirection corresponding to the service request in the interruption manner; and after the redirection of the service request is interrupted in the interruption manner, resuming the redirection of the service request to the destination address; wherein an interruption manner for interrupting the redirection of the service request is configured in the continuous 302 redirection method pool.

The method further includes: storing, in a memory, a correspondence relationship between a service ID corresponding to the service request and the number of redirections; wherein an initial value of the number of redirections is 0;

each time the service request is redirected to the destination address, determining the service ID corresponding to the service request, and adding 1 to the number of redirections corresponding to the service ID in the memory; and when the redirection of the service request is interrupted, determining the service ID corresponding to the service request, and resetting the number of redirections corresponding to the service ID in the memory.

The method further includes: when the number of redirections does not reach the pre-set threshold value, if error processing induced by the case where the number of redirections exceeds the pre-set threshold value occurs in the service request, determining the service ID corresponding to the service request, and querying for the number of redirections corresponding to the service ID in the memory; and adjusting the pre-set threshold value to the number of redirections corresponding to the service ID, and resetting the number of redirections corresponding to the service ID in the memory.

Before a service request that redirection processing needs to be performed is received, the method further includes: intercepting all service requests in the process of redirecting a service request to a destination address, to select, from all the service requests, a service request that redirection processing needs to be performed.

The redirection specifically includes a 302 redirection.

The embodiments of the present application provide a redirection processing device, the redirection processing device including:

a determination module, configured to, when a service request that redirection processing needs to be performed is received, determine the number of redirections corresponding to the service request;

a judgment module, configured to judge whether the number of redirections reaches a pre-set threshold value; and a processing module, configured to, if the number of redirections reaches the pre-set threshold value, interrupt the redirection of the service request, and after the redirection of the service request is interrupted, resume redirecting the service request to a destination address; and if the number of redirections does not reach the pre-set threshold value, redirect the service request to the destination address.

The processing module is specifically configured to temporarily insert an intermediate page, to interrupt continuous redirection corresponding to the service request by inserting the intermediate page; and after the redirection of the service request is interrupted by inserting the intermediate page, resume redirecting the service request to the destination address.

The head of an HTML of the intermediate page includes a pre-set instruction for resuming the redirecting the service request to the destination address after the intermediate page is inserted.

The processing module is specifically configured to call an interruption manner configured in a continuous 302 redirection method pool, and interrupt continuous redirection corresponding to the service request in the interruption manner; and after the redirection of the service request is interrupted in the interruption manner, resume redirecting the service request to the destination address; wherein an interruption manner for interrupting the redirection of the service request is configured in the continuous 302 redirection method pool.

The determination module is further configured to store, in a memory, a correspondence relationship between a service ID corresponding to the service request and the number of redirections; wherein an initial value of the number of redirections is 0;

each time the service request is redirected to the destination address, determine the service ID corresponding to the service request, and add 1 to the number of redirections corresponding to the service ID in the memory; and when the redirection of the service request is interrupted, determine the service ID corresponding to the service request, and reset the number of redirections corresponding to the service ID in the memory.

The determination module is further configured to, when the number of redirections does not reach the pre-set threshold value, if error processing induced by the case where the number of redirections exceeds the pre-set threshold value occurs in the service request, determine the service ID corresponding to the service request, and query for the number of redirections corresponding to the service ID in the memory; and adjust the pre-set threshold value to the number of redirections corresponding to the service ID, and reset the number of redirections corresponding to the service ID in the memory.

The determination module is further configured to, before a service request that redirection processing needs to be performed is received, intercept all service requests in the process of redirecting a service request to a destination address, to select, from all the service requests, a service request that redirection processing needs to be performed.

The redirection specifically includes a 302 redirection.

In the embodiments of the present application, prior to performing redirection processing on a service request, a redirection processing device judges whether the number of redirections reaches a pre-set threshold value, when the number of redirections reaches the pre-set threshold value, interrupts redirection of the service request, and after the redirection of the service request is interrupted, resumes redirecting the service request to a destination address, thereby avoiding error processing (e.g. 404 error) induced by the case where the number of redirections exceeds the number of times restricted by a browser, and thus avoiding service interruption and service failure and improving the service experience and the user experience.

BRIEF DESCRIPTION OF THE DRAWINGS

In order to describe the technical solutions in the embodiments of the present application more clearly, the accompanying drawings to be used in the description about the embodiments of the present application are introduced briefly in the following. It is apparent that the accompanying drawings in the following description are merely some embodiments of the present application, and those of ordinary skill in the art can also obtain other accompanying drawings according to the accompanying drawings of the embodiments of the present application without making creative efforts.

DETAILED DESCRIPTION OF EMBODIMENTS

The technical solutions in the embodiments of the present application will be clearly and completely described below with reference to the accompanying drawings in the embodiments of the present application. It is apparent that the embodiments described are merely some, instead of all, of the embodiments of the present application. Based on the embodiments in the present application, all other embodiments obtained by those of ordinary skill in the art without making creative efforts shall be encompassed by the protection scope of the present application.

Embodiment 1

With respect to the problems existing in the prior art, a method for processing continuous redirection according to Embodiment 1 of the present application is applied to a network including a client, a server and a redirection processing device. The network may be a large website or distributed system. The redirection processing device may be deployed on a server as a functional module. The redirection processing device may also be used as a separate apparatus in the network. In the embodiment of the present application, the redirection processing device is configured to process redirection procedures of a service request. For example, when a client (browser) sends a service request (i.e., a WEB service request) to a server, the service request is sent to an address A. The following redirection procedures are all processed by the redirection processing device, for example, the redirection processing device redirects the service request to an address B, the redirection processing device then redirects the service request to an address C, the redirection processing device then redirects the service request to an address D, and so on.

Figure 1:
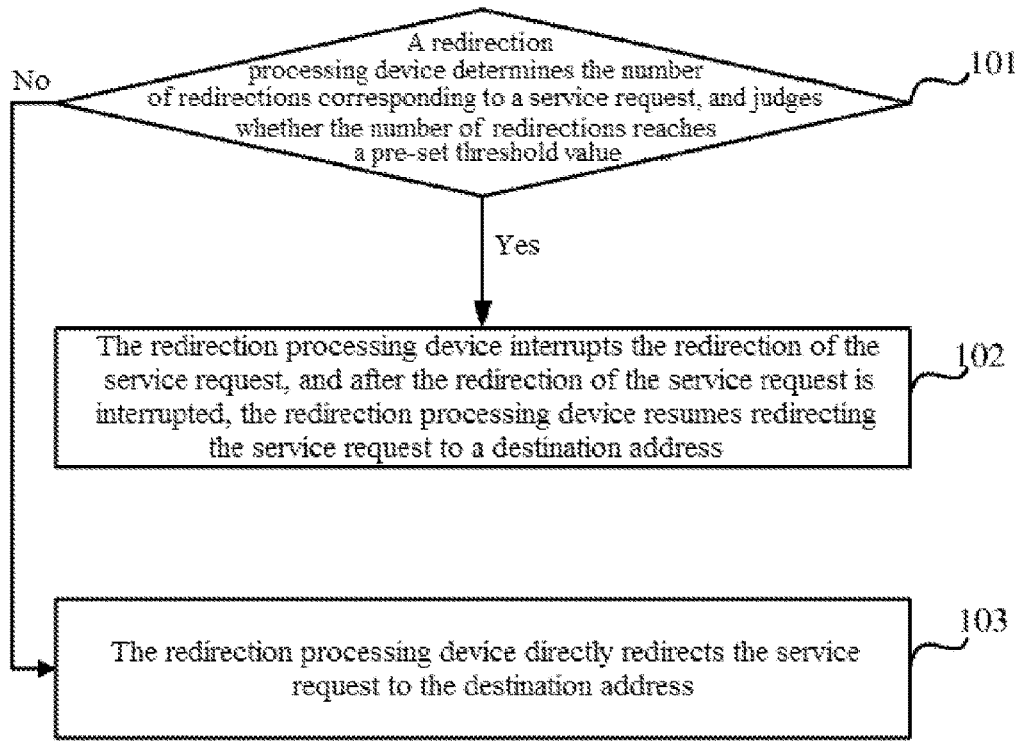
FIG. 1 is a schematic flow chart of a method for processing continuous redirection according to Embodiment 1 of the present application.

In the above application scenario, as shown in FIG. 1, the method for processing continuous redirection includes the following steps:

Step 101: When a service request that redirection processing needs to be performed is received, a redirection processing device determines the number of redirections corresponding to the service request, and judges whether the number of redirections reaches a pre-set threshold value. If the number of redirections reaches the pre-set threshold value, step 102 is performed. If the number of redirections does not reach the pre-set threshold value, step 103 is performed.

In the embodiment of the present application, the pre-set threshold value may be set by the redirection processing device based on the number of redirections restricted by the browser. For example, when the browser may perform error processing if the number of redirections exceeds 5, the redirection processing device may set the pre-set threshold value to 4 (5-1) times.

In the embodiment of the present application, in the process that the server redirects the service request to the destination address, the redirection processing device intercepts all service requests, to select, from all the service requests, a service request that redirection processing needs to be performed. Based on this, for the service request sent by the client to the server, the redirection processing device needs to intercept the service request. If the service request does not need redirection processing, the redirection processing device releases the service request, to perform subsequent service processing on the service request which will not be described in detail herein. If the service request needs redirection processing, the redirection processing device determines that it is necessary to perform redirection processing on the service request, determines the number of redirections corresponding to the service request, and judges whether the number of redirections reaches a pre-set threshold value.

Step 102: The redirection processing device interrupts the redirection of the service request, and after the redirection of the service request is interrupted, the redirection processing device resumes redirecting the service request to a destination address.

Step 103: The redirection processing device directly redirects the service request to the destination address.

In the embodiment of the present application, the redirection processing device needs to store, in a memory, a correspondence relationship between a service ID corresponding to the service request and the number of redirections; wherein an initial value of the number of redirections is 0. Based on this, when it is necessary to perform redirection processing on the service request, the redirection processing device determines a service ID corresponding to the service request, obtains the number of redirections corresponding to the service ID by querying the correspondence relationship between the service ID and the number of redirections that is stored in the memory, determines the number of redirections as the number of redirections corresponding to the service request, and then judges whether the number of redirections reaches a pre-set threshold value.

Further, each time the redirection processing device redirects the service request to the destination address, it needs to determine the service ID corresponding to the service request, and adds 1 to the number of redirections corresponding to the service ID in the memory. When the redirection processing device interrupts the redirection of the service request, it needs to determine the service ID corresponding to the service request, and resets the number of redirections corresponding to the service ID in the memory.

In the embodiment of the present application, the process that the redirection processing device interrupts the redirection of the service request, and after the redirection of the service request is interrupted, the redirection processing device resumes redirecting the service request to a destination address specifically includes, but is not limited to, the following manners: the redirection processing device temporarily inserts an intermediate page, to interrupt continuous redirection corresponding to the service request by inserting the intermediate page; and further, after the redirection of the service request is interrupted by inserting the intermediate page, the redirection processing device resumes redirecting the service request to the destination address.

The intermediate page includes, but is not limited to, a 200OK page (for returning an acknowledgment to the client).

The redirection processing device temporarily inserts an intermediate page, to interrupt continuous redirection corresponding to the service request by inserting the intermediate page, and after the intermediate page is refreshed, the redirection processing device can resume redirecting the service request to the destination address, that is, redirect the service request to a subsequent page or a Uniform Resource Locator (URL) address, thus continuing the service.

The head of an HTML of the intermediate page includes a pre-set instruction for enabling the redirection processing device to resume redirecting the service request to the destination address after the intermediate page is inserted. Specifically, the pre-set instruction may be a piece of code, and the code may carry a destination address to which the service request needs to be redirected. The code specifically includes, but is not limited to, the following code: <meta http-equiv="refresh" content="0; url=nextUrl">; meta is used to describe the attribute of the code, and the meta has two attributes, namely, an http-equiv attribute and a content attribute, wherein the http-equiv attribute being refresh indicates that the code is used for automatically refreshing the page, the content attribute being 0 indicates that the content of the page is null, and nextUrl is the destination address to which the service request needs to be redirected. Based on the pre-set instruction, after an intermediate page corresponding to the pre-set instruction is inserted, the intermediate page may interrupt continuous redirection corresponding to the service request. Based on that the http-equiv attribute in the pre-set instruction is refresh, automatic refreshing of the intermediate page may be implemented. After the automatic refreshing, based on the content of nextUrl in the pre-set instruction, the redirection processing device can resume redirecting the service request to the destination address, that is, redirecting the service request to a subsequent page or a URL address, and performing the subsequent service.

In the embodiment of the present application, the process that the redirection processing device interrupts the redirection of the service request, and after the redirection of the service request is interrupted, the redirection processing device resumes redirecting the service request to a destination address specifically includes, but is not limited to, the following manners: the redirection processing device calls an interruption manner configured in a continuous 302 redirection method pool, and interrupts continuous redirection corresponding to the service request in the interruption manner; and after the redirection of the service request is interrupted in the interruption manner, resumes redirecting the service request to the destination address; wherein an interruption manner for interrupting the redirection of the service request is configured in the continuous 302 redirection method pool.

In the embodiment of the present application, when the number of redirections does not reach the pre-set threshold value, if error processing (for example, the browser outputs a 404 error) induced by the case where the number of redirections exceeds the pre-set threshold value occurs in the service request, it indicates that the pre-set threshold value configured on the redirection processing device is too large. Based on this, the redirection processing device needs to adjust the pre-set threshold value configured thereon. In the process of adjusting the preset threshold, the redirection processing device needs to determine the service ID corresponding to the service request, and query for the number of redirections currently corresponding to the service ID in the memory. Afterwards, the redirection processing device adjusts the pre-set threshold value configured thereon to the number of redirections currently corresponding to the service ID. Further, if error processing (for example, the browser outputs a 404 error) induced by the case where the number of redirections exceeds the pre-set threshold value occurs in the service request, the redirection processing device further needs to reset the number of redirections corresponding to the service ID in the memory.

In the embodiment of the present application, the redirection specifically includes, but is not limited to, a 302 redirection.

In summary, the embodiment of the present application at least has the following advantages: in the embodiment of the present application, prior to performing redirection processing on a service request, a redirection processing device judges whether the number of redirections reaches a pre-set threshold value, when the number of redirections reaches the pre-set threshold value, interrupts redirection of the service request, and after the redirection of the service request is interrupted, resumes redirecting the service request to a destination address, thereby avoiding error processing (e.g. 404 error) induced by the case where the number of 302 redirections exceeds the number of times restricted by a browser, and thus avoiding service interruption and service failure and improving the service experience and the user experience.

Embodiment 2

In a specific application, Embodiment 2 of the present application provides a method for processing continuous redirection. The method is applied to a network including a client, a server and a redirection processing device. The network may be a large website or distributed system. The redirection processing device may be deployed on a server as a functional module. The redirection processing device may also be used as a separate apparatus in the network. In the embodiment of the present application, the redirection processing device is configured to process redirection procedures of a service request. For example, when a client (browser) sends a service request (i.e., a WEB service request) to a server, the service request is sent to an address A. The following redirection procedures are all processed by the redirection processing device, for example, the redirection processing device redirects the service request to an address B, the redirection processing device then redirects the service request to an address C, the redirection processing device then redirects the service request to an address D, and so on.

Figure 2:
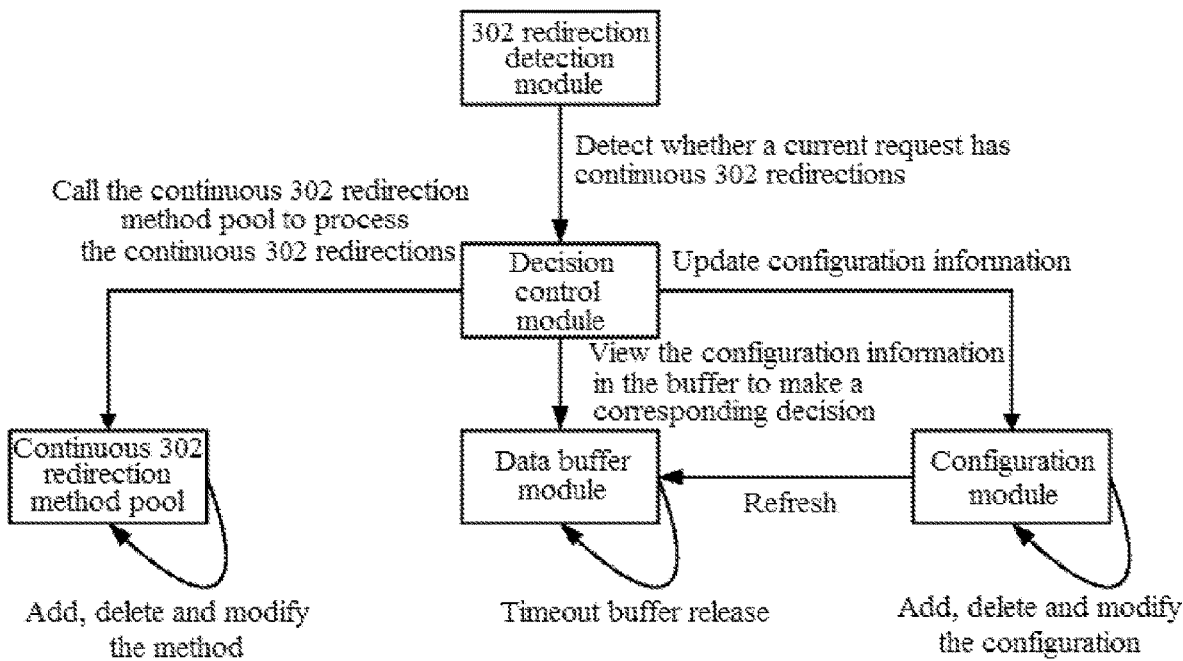
FIG. 2 is a schematic structural diagram of a redirection processing device according to Embodiment 2 of the present application.

In the embodiment of the present application, as shown in FIG. 2, it is a structural schematic diagram of a redirection processing device. The redirection processing device may specifically include the following functional modules: a 302 redirection detection module, a decision control module, a continuous 302 redirection method pool, a data buffer module and a configuration module. The functional modules in the redirection processing device may be integrated together and may also be deployed separately. The functional modules may be combined into one module, and may also be further divided into a plurality of sub-modules.

(1) The 302 redirection detection module. The 302 redirection detection module is mainly responsible for intercepting a 302 redirection request. For non-302 redirections, the 302 redirection detection module directly releases them, and resumes subsequent service operations. For 302 redirections, the 302 redirection detection module synchronizes related information (e.g., a redirection address and so on) of a 302 redirection to the decision control module if finding that there is a 302 redirection.

(2) The decision control module. The decision control module is responsible for linking the 302 redirection detection module, the continuous 302 redirection method pool, the data buffer module and the configuration module. The decision control module receives 302 redirection information of the 302 redirection detection module, and according to related information of the data buffer module and the configuration module, calculates whether there are continuous 302 redirections and whether the number of the continuous 302 redirections reaches the configured maximum number of times of the browser. If the number of the continuous 302 redirections reaches the maximum number of times of the browser, the decision control module calls a method in the continuous 302 redirection method pool to perform corresponding processing. If a 404 error has appeared before the number of 302 redirections does not reach the maximum number of times of the browser, the decision control module is responsible for recording alarm information, and refreshing a memory in the data buffer module by calling the configuration module to modify the maximum number of times of the browser.

(3) The continuous 302 redirection method pool. When there are continuous 302 redirections and the decision control module knows that the number of the continuous 302 redirections reaches the maximum number of times of the browser, the continuous 302 redirection method pool provides a method for the decision control module, and the decision control module calls a method in the continuous 302 redirection method pool to perform corresponding processing. The continuous 302 redirection method pool may be provided with multiple processing methods, and an application can select a processing method on its own according to an actual situation. For example, the methods configured in the continuous 302 redirection method pool include: temporarily inserting an intermediate page, returning to 200, interrupting a continuous 302 redirection, and, after refreshing, redirecting to a subsequent page or a URL address, to continue the service. Further, the continuous 302 redirection method pool further needs to provide addition, deletion, modification and other functions of the processing method.

(4) The data buffer module. It is mainly responsible for buffering application configuration information, for example, it buffers the maximum number of times of the browser, the number of redirections corresponding to the service ID and other configuration information. Further, the data buffer module further needs to provide a buffer timeout release function and the like, that is, after the configuration information being buffered is overtime (for example, the data has been buffered for 24 hours), the data buffer module needs to delete the buffered configuration information.

(5) The configuration module. Based on the configuration module, an application, according to its own service, configures the number of times of continuous 302 jump for the corresponding server. Based on the configuration module, when the number of continuous 302 jumps reaches a configured value, a corresponding solution is configured, that is, a method in the continuous 302 redirection method is configured. Further, the configuration module further needs to provide addition, deletion, modification and other functions of the configuration information.

Figure 3:
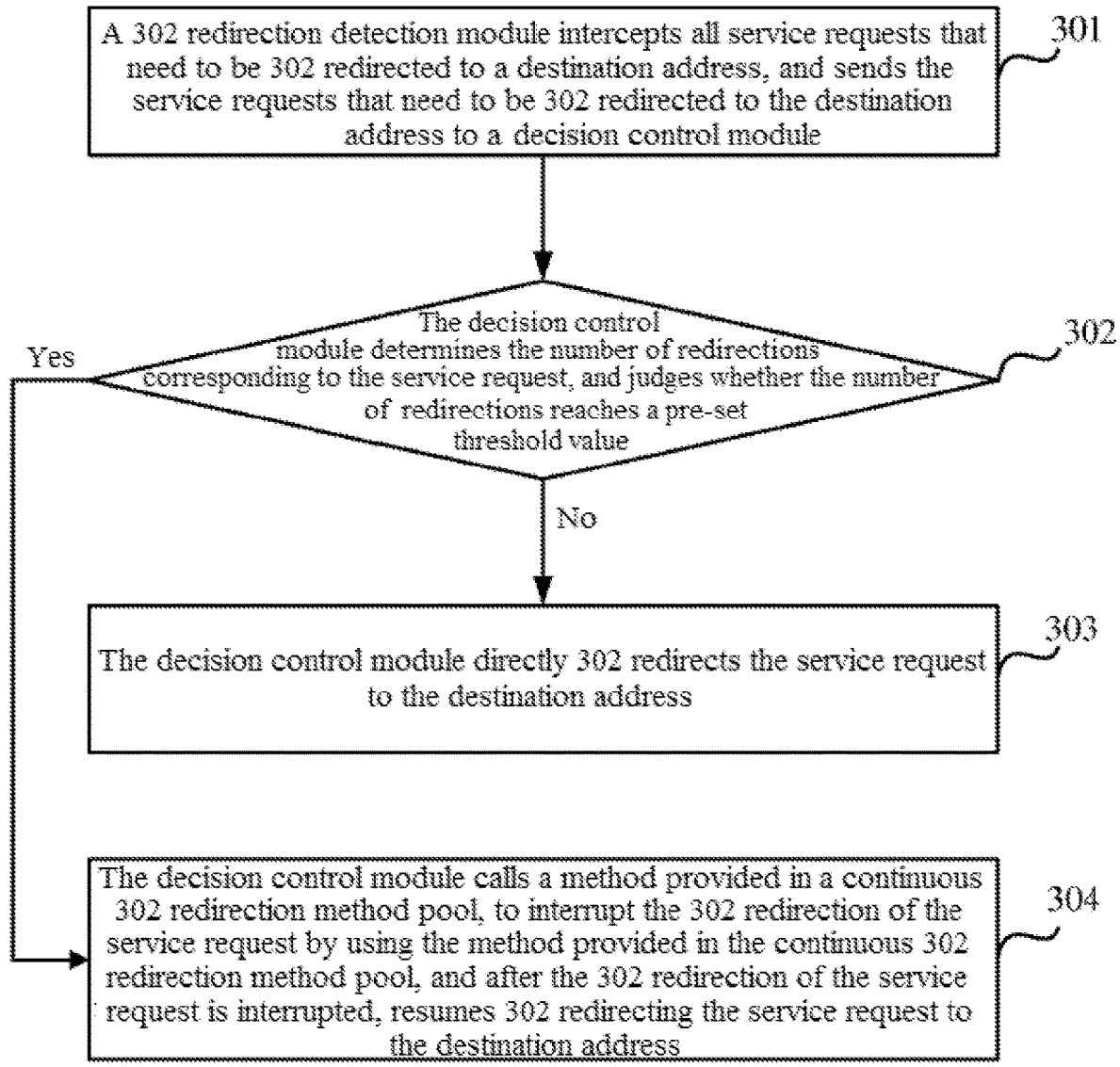
FIG. 3 is a schematic flow chart of a method for processing continuous redirection according to Embodiment 2 of the present application.

In the above application scenario, as shown in FIG. 3, the method for processing continuous redirection includes the following steps:

Step 301: A 302 redirection detection module intercepts all service requests that need to be 302 redirected to a destination address, and sends the service requests that need to be 302 redirected to the destination address to a decision control module.

In the embodiment of the present application, in the process that a server 302 redirects a service request (i.e., a WEB service request) to a destination address, the 302 redirection detection module needs to intercept all service requests that need to be 302 redirected to the destination address. Based on this, for a service request sent by a client to the server, the 302 redirection detection module needs to intercept the service request. If the service request does not need 302 redirection processing, the 302 redirection detection module releases the service request, to perform subsequent service processing on the service request which will not be described in detail herein. If the service request needs 302 redirection processing, the 302 redirection detection module determines that it is necessary to perform 302 redirection processing on the service request, and sends the service request that needs to be 302 redirected to the destination address to the decision control module for subsequent processing.

Step 302: The decision control module determines the number of redirections corresponding to the service request, and judges whether the number of redirections reaches a pre-set threshold value (i.e., the maximum number of times of the browser configured by the configuration module). If the number of redirections does not reach the pre-set threshold value, step 303 is performed. If the number of redirections reaches the pre-set threshold value, step 304 is performed. The pre-set threshold value is the maximum number of continuous 302 redirections acceptable by the browser that is configured by the configuration module.

In the embodiment of the present application, the data buffer module needs to store, in a memory, a correspondence relationship between a service ID corresponding to the service request and the number of redirections; wherein an initial value of the number of redirections is 0. Based on this, when it is necessary to perform 302 redirection processing on the service request, the decision control module needs to determine a service ID corresponding to the service request, obtains the number of redirections corresponding to the service ID by querying for the correspondence relationship between the service ID and the number of redirections that is stored in the memory, determines the number of redirections as the number of redirections corresponding to the service request, and then judges whether the number of redirections reaches a pre-set threshold value.

The data buffer module needs to store, in a memory, a correspondence relationship between a service ID corresponding to the service request and the number of redirections. Each time the service request is 302 redirected to the destination address, the data buffer module needs to determine the service ID corresponding to the service request, and add 1 to the number of redirections corresponding to the service ID in the memory. When the 302 redirection of the service request is interrupted, the data buffer module needs to determine the service ID corresponding to the service request, and reset the number of redirections corresponding to the service ID in the memory.

Step 303: The decision control module directly 302 redirects the service request to the destination address. The decision control module notifies the 302 redirection detection module to resume monitoring the 302 redirection, that is, perform step 301.

Step 304: The decision control module calls a method provided in a continuous 302 redirection method pool, to interrupt the 302 redirection of the service request by using the method provided in the continuous 302 redirection method pool, and after the 302 redirection of the service request is interrupted, resumes 302 redirecting the service request to the destination address. The decision control module notifies the 302 redirection detection module to resume monitoring the 302 redirection, that is, perform step 301.

Suppose that the method provided in the continuous 302 redirection method pool is: temporarily inserting an intermediate page, returning 200OK, interrupting a continuous 302 redirection, and, after refreshing, 302 redirecting to a subsequent page or a URL address, to continue the service. Based on the method provided in the continuous 302 redirection method pool, the process that the decision control module interrupts the 302 redirection of the service request, and after the 302 redirection of the service request is interrupted, resumes 302 redirecting the service request to the destination address specifically includes, but is not limited to, the following manners: the decision control module temporarily inserts an intermediate page, to interrupt continuous 302 redirection of the service request by inserting the intermediate page; and further, after the decision control module interrupts the 302 redirection of the service request by inserting the intermediate page, it may resume 302 redirecting the service request to the destination address.

The intermediate page includes, but is not limited to, a 200OK page. The decision control module temporarily inserts an intermediate page, to interrupt continuous 302 redirection of the service request by inserting the intermediate page, and after the intermediate page is refreshed, the decision control module resumes 302 redirecting the service request to the destination address, that is, 302 redirects the service request to a subsequent page or a URL address, thus continuing the service.

The head of an HTML of the intermediate page may include the following code, and the code is used for enabling the decision control module to resume 302 redirecting the service request to the destination address after an intermediate page is inserted; <meta http-equiv="refresh" content="0; url=nextUrl">; wherein nextUrl is the destination address to which the service request needs to be 302 redirected. Based on the code, the intermediate page can interrupt the continuous 302 redirection corresponding to the service request, implement automatic refreshing of the intermediate page, and enable the decision control module to resume 302 redirecting the service request to the destination address and performing the subsequent services.

In the embodiment of the present application, when the number of redirections does not reach the pre-set threshold value (i.e., it has not reached the configured maximum number of 302 redirections), if error processing (for example, a browser outputs a 404 error) induced by the case where the number of redirections exceeds the pre-set threshold value (i.e., the maximum number of continuous 302 redirections acceptable by the browser) occurs in the service request, it indicates that the pre-set threshold value configured by the configuration module is too large. Based on this, the decision control module needs to readjust the pre-set threshold value buffered by the data buffer module. In the process of adjusting the pre-set threshold value, the decision control module needs to determine a service ID corresponding to the service request, and query for the number of redirections currently corresponding to the service ID in the memory. Afterwards, the decision control module adjusts the pre-set threshold value buffered by the data buffer module to the number of redirections currently corresponding to the service ID. Further, if error processing (for example, the browser outputs a 404 error) induced by the case where the number of redirections exceeds the pre-set threshold value occurs in the service request, the decision control module further needs to reset the number of redirections corresponding to the service ID in the memory.

In summary, the embodiment of the present application at least has the following advantages: in the embodiment of the present application, prior to performing 302 redirection processing on a service request, a decision control module judges whether the number of redirections reaches a pre-set threshold value, when the number of redirections reaches the pre-set threshold value, interrupts 302 redirection of the service request, and after the 302 redirection of the service request is interrupted, resumes 302 redirecting the service request to a destination address, thereby avoiding error processing induced by the case where the number of 302 redirections exceeds the number of times restricted by a browser, and thus avoiding service interruption and service failure and improving the service experience and the user experience.

In the embodiment of the present application, the redirection is described with 302 redirection, which may not be limited thereto in actual applications.

Embodiment 3

Figure 4:
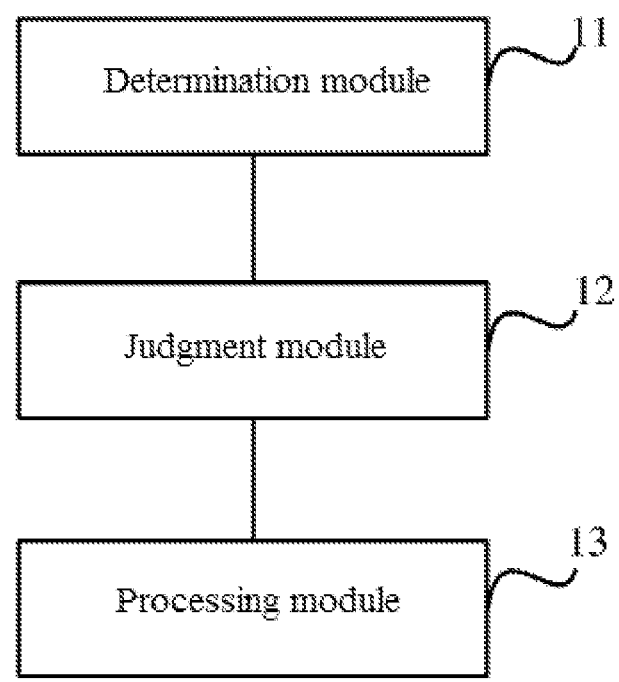
FIG. 4 is a schematic structural diagram of a redirection processing device according to Embodiment 3 of the present application.

Based on an application concept the same as that of the method, the embodiment of the present application further provides a redirection processing device. As shown in FIG. 4, the redirection processing device specifically includes:

a determination module 11, configured to, when a service request that redirection processing needs to be performed is received, determine the number of redirections corresponding to the service request;

a judgment module 12, configured to judge whether the number of redirections reaches a pre-set threshold value; and a processing module 13, configured to, if the number of redirections reaches the pre-set threshold value, interrupt the redirection of the service request, and after the redirection of the service request is interrupted, resume redirecting the service request to a destination address; and if the number of redirections does not reach the pre-set threshold value, redirect the service request to the destination address.

The processing module 13 is specifically configured to temporarily insert an intermediate page, to interrupt continuous redirection corresponding to the service request by inserting the intermediate page; and after the redirection of the service request is interrupted by inserting the intermediate page, resume redirecting the service request to the destination address.

The head of an HTML of the intermediate page includes a pre-set instruction for resuming the redirection of the service request to the destination address after the intermediate page is inserted. The pre-set instruction may carry the destination address to which the service request needs to be redirected. The pre-set instruction may specifically be a program code.

The processing module 13 is specifically configured to call an interruption manner configured in a continuous 302 redirection method pool, and interrupt continuous redirection corresponding to the service request in the interruption manner; and after the redirection of the service request is interrupted in the interruption manner, resume redirecting the service request to the destination address; wherein an interruption manner for interrupting the redirection of the service request is configured in the continuous 302 redirection method pool.

The determination module 11 is further configured to store, in a memory, a correspondence relationship between a service ID corresponding to the service request and the number of redirections; wherein an initial value of the number of redirections is 0;

each time the service request is redirected to the destination address, determine the service ID corresponding to the service request, and add 1 to the number of redirections corresponding to the service ID in the memory; and when the redirection of the service request is interrupted, determine the service ID corresponding to the service request, and reset the number of redirections corresponding to the service ID in the memory.

The determination module 11 is further configured to, when the number of redirections does not reach the pre-set threshold value, if error processing induced by the case where the number of redirections exceeds the pre-set threshold value occurs in the service request, determine the service ID corresponding to the service request, and query for the number of redirections corresponding to the service ID in the memory; and adjust the pre-set threshold value to the number of redirections corresponding to the service ID, and reset the number of redirections corresponding to the service ID in the memory.

The determination module 11 is further configured to, before a service request that redirection processing needs to be performed is received, intercept all service requests in the process of redirecting a service request to a destination address, to select, from all the service requests, a service request that redirection processing needs to be performed.

In the embodiment of the present application, the redirection specifically includes 302 redirection.

The modules of the device in the present application may be integrated together and may also be deployed separately. The functional modules may be combined into one module, and may also be further divided into a plurality of submodules.

Through the above description of the embodiments, it is apparent to those skilled in the art that the present application may be implemented in software plus a necessary universal hardware platform, and definitely may also be implemented in hardware. However, the former is a preferred implementation under most circumstances. Based on such understanding, the above technical solution of the present application or the part that makes contributions to the prior art can be embodied in the form of a software product. Such a computer software product may be stored in a storage medium, and contain several instructions to instruct a computer apparatus (which may be a personal computer, a server, a network apparatus or the like) to perform the method as described in the embodiments of the present application. It should be understood by those skilled in the art that the accompanying drawings are merely schematic diagrams of one preferred embodiment, and modules or processes in the accompanying drawings are not necessarily required in implementing the present application. It should be understood by those skilled in the art that the modules in the device according to the embodiment may be distributed in the device of the embodiment according to the description of the embodiment, or be correspondingly changed to be disposed in one or more devices different from that in this embodiment. The modules of the above embodiment may be combined into one module, and may also be further divided into a plurality of sub-modules. The sequence numbers of the above embodiments of the present application are merely for the convenience of description, and do not imply the preference among the embodiments. The above descriptions are merely several specific embodiments of the present application. However, the present application is not limited thereto. Any variations that can be thought of by those skilled in the art should all fall within the protection scope of the present application.

The invention claimed is:

1. A method for processing continuous redirection, comprising:
receiving a service request from a client, wherein the service request requires a redirection process comprising one or more redirections leading to a destination address;
counting a number of redirections that have been performed in response to the service request, wherein the counting comprises:
storing, in a memory, a correspondence relationship between a service ID corresponding to the service request and the number of redirections, wherein an initial value of the number of redirections is 0; and
for each redirection, adding 1 to the number of redirections corresponding to the service ID in the memory;
obtaining a pre-set threshold value associated with the service ID, wherein the obtaining comprises:
if error processing occurs when the number of redirections stored in the memory is smaller than the pre-set threshold value, adjusting the pre-set threshold value to the number of redirections corresponding to the service ID when the error processing occurs;
determining that the counted number of redirections is equal to or greater than the pre-set threshold value;
interrupting, based on the determining, the redirection process by sending an intermediate page to the client;
when the redirection process is interrupted, resetting the number of redirections corresponding to the service ID in the memory; and
resuming the redirection process by performing one or more remaining redirections, wherein the resuming comprises refreshing the intermediate page.

2. The method of claim 1, wherein:
the intermediate page comprises Hyper Text Markup Language (HTML) elements; and
a head of the intermediate page comprises a pre-set instruction for resuming the redirection process.

3. The method of claim 1, wherein the interrupting comprises:
calling a method configured in a continuous redirection method pool; and
interrupting the redirection process based on the called method.

4. The method of claim 1, wherein the receiving comprises:
intercepting a plurality of service requests; and
selecting, from the intercepted service requests, a service request for which redirection processing needs to be performed.

5. A system comprising a processor and a non-transitory computer-readable storage medium storing instructions executable by the processor to cause the system to perform operations comprising:
receiving a service request from a client, wherein the service request requires a redirection process comprising one or more redirections leading to a destination address;
counting a number of redirections that have been performed in response to the service request, wherein the counting comprises:
storing, in a memory, a correspondence relationship between a service ID corresponding to the service request and the number of redirections, wherein an initial value of the number of redirections is 0; and
for each redirection, adding 1 to the number of redirections corresponding to the service ID in the memory;
obtaining a pre-set threshold value associated with the service ID, wherein the obtaining comprises:
if error processing occurs when the number of redirections stored in the memory is smaller than the pre-set threshold value, adjusting the pre-set threshold value to the number of redirections corresponding to the service ID when the error processing occurs;
determining that the counted number of redirections is equal to or greater than a pre-set threshold value;
interrupting, based on the determining, the redirection process by sending an intermediate page to the client;
when the redirection process is interrupted, resetting the number of redirections corresponding to the service ID in the memory; and
resuming the redirection process by performing one or more remaining redirections, wherein the resuming comprises refreshing the intermediate page.

6. The system of claim 5, wherein:
the intermediate page comprises Hyper Text Markup Language (HTML) elements; and
a head of the intermediate page comprises a pre-set instruction for resuming the redirection process.

7. The system of claim 5, wherein the interrupting comprises:
calling a method configured in a continuous redirection method pool; and
interrupting the redirection process based on the called method.

8. The system of claim 5, wherein the receiving comprises:
intercepting a plurality of service requests; and
selecting, from the intercepted service requests, a service request for which redirection processing needs to be performed.

* * * * *